B. E. ELDRED.
PROCESS OF MAKING CLAD METALS.
APPLICATION FILED FEB. 11, 1909.
1,189,194.
Patented June 27, 1916.
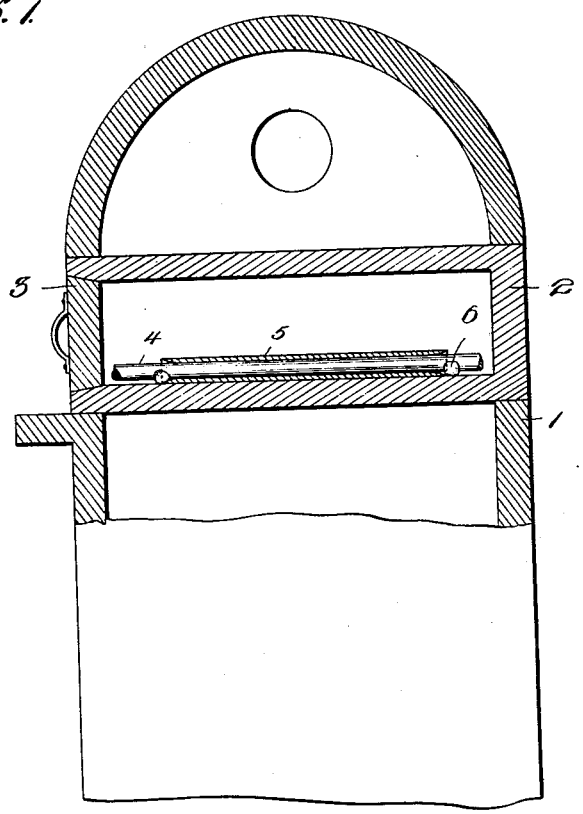
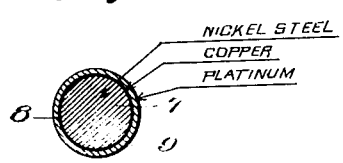
Inventor
Byron E. Eldred
by W. P. McElroy
Attorney
Witnesses

UNITED STATES PATENT OFFICE.

BYRON E. ELDRED, OF NEW YORK, N. Y., ASSIGNOR, BY MESNE ASSIGNMENTS, TO GENERAL ELECTRIC COMPANY, A CORPORATION OF NEW YORK.

PROCESS OF MAKING CLAD METALS.

1,189,194.

Specification of Letters Patent. Patented June 27, 1916.

Application filed February 11, 1909. Serial No. 477,281.

*To all whom it may concern:*

Be it known that I, BYRON E. ELDRED, a citizen of the United States, residing in New York city, in the county and State of New York, have invented certain new and useful Improvements in Processes of Making Clad Metals, of which the following is a specification.

This invention relates to processes of making clad metals; and it comprises a method of producing clad metals having an exterior sheathing layer of a noble metal and a core of stronger and stiffer metal of the iron class metallically united therewith wherein a core of such stronger and stiffer metal is provided with a thin coating or film coating of a ductile metal having a somewhat lower melting point and a relatively high rate of expansion and is inserted in a noble metal tube or shell closely fitting the same and the assembled bodies heated until the expansion of the film produces pressure therebetween and fills all interstices and spaces between core and shell and metallically unites the same with a firm and permanent union at all points between abutting surfaces; all as more fully hereinafter set forth and as claimed.

In the manufacture of electrical appliances of various kinds, it is frequently necessary to seal conductors through glass walls with an absolutely gas-tight joint, as in making incandescent lamps, Geissler tubes, etc. Heretofore, practically nothing but platinum has been found suitable for this purpose, though many substitutes have been proposed. Platinum unites a number of desirable properties for this purpose, its rate of expansion and contraction on heating and cooling approximating that of many varieties of glass, so that a joint made by passing a platinum wire through fused or semi-fused glass does not fail when the wire and glass become cold. Its expansion (0.0000899 to 0.0000091 per degree C.) is somewhat in excess of that of even the high-expansion glasses used in lamp making (reaching 0.00000810) but the difference, probably because of the strong adhesion existing between glass and platinum, does not preclude making seals.

Platinum has a surface which remains metallic at all temperatures and with which glass in a fused or semi-fused state will unite by what may be termed a "wetting union;" an actual molecular contact in the same sense that the wetting of a glass rod by water is molecular. Such a union as this leaves neither a sensible space nor a seam between the metal and the glass; and is, of course, absolutely gas-tight. Other noble metals, such as gold, are wetted by soft glass in much the same way, though not so perfectly, but their rates of expansion are usually so widely different from that of glass that glass and metal break away on cooling. There are other metals and alloys than platinum having about the same rate of expansion as glass; as, for instance, alloys of nickel and iron which can be given almost any rate of expansion desired by suitable proportioning of the two metals. But none of these has proved satisfactory for sealing-in purposes since glass does not readily unite with their surfaces to form the necessary wetting union, and no matter how carefully sealing be performed, there are always avenues or seams left through which air or gas can enter. In time, the indefinitely minute gas molecules of air will find any line of non-union or of simple juxtaposition of surfaces which may exist. In an evacuated incandescent electric lamp, for instance, it has been found that the vacuum will not long persist if leading-in wires of any other metal than platinum be employed. The failure of glass to form the desired type of union with these other and non-noble metals and alloys may be due to their ready oxidation, especially when heated, preventing the glass and the metal actually touching; or it may be due to an absolute lack of physical affinity between the glass and the metal; such a lack as, for instance, exists between glass and mercury. Whatever the reason, the fact exists. Aside from its expense, which is considerable, platinum itself however has not been found wholly satisfactory for this purpose as it is a comparatively soft, weak metal, which does not well withstand the manipulation necessary in sealing in leading-in wires. To secure good joints and for many other reasons, it is practically necessary to use very fine wires for this purpose, thicker wires not giving good seals, and platinum is not strong enough to withstand much manipulation in wires of fine gage. The percentage of loss from this cause in making incandescent lamps is considerable. Furthermore, and this is a very important consideration, the expansion of platinum by heat is a fixed quantity while the expansion of glass depends upon its composition. No two factories make glass of the same composition and expansion, and in practice it is found difficult to secure glass of a rate of expansion which will approach sufficiently near that of platinum. The glass produced in most American factories has a materially different rate of expansion from that of platinum. And of course the rate of expansion of platinum cannot be adjusted to fit that of the glass which is to be used.

Many attempts have been made to employ compound metals for leading-in wires; a core of nickel-steel, for instance, being provided with a sheath of platinum, but no practical success along these lines has hitherto been attained. This was largely for the reason that the core and sheath metals were not united, a seam or line of non-union existing between them so that on the one hand air was bound to penetrate in time, however closely the surfaces of the two metals were approximated, and on the other hand, the platinum sheath had to be of sufficient thickness to have mechanical strength of its own. And with the penetration of air, there is generally more or less corrosion and oxidation along the surface of the non-noble metal as such metal and the platinum offers an excellent galvanic couple, so that seams open further in time.

Platinum and other noble metals do not readily unite with ferrous metals, such as iron, steel and the various alloy steels and iron-like metals such as nickle and cobalt, to form any union analogous to a weld union; a union in which molecule is united to molecule. Platinum is not even readily wetted by fused iron or steel at its casting temperature. It is for this reason that in the stated prior art where a core of such a metal as nickel-steel was assembled with a sheath or shell of platinum and the two metals worked down together no real union, or anything more than a mechanical fitting-together or juxtaposition, could be attained. And such a mere contacting is not sufficient for the stated purposes.

I have found however that by various expedients such a true metallic union between the sheath-metal and the core-metal as is desired may be effected; a product being obtained in which there is no seam or line or non-union; all points between abutting surfaces of proximate metals being molecularly united. With a union of this character, there is no opportunity for penetration of air or gas. Platinum may, for instance, be weld-united to iron and ferrous metals by contacting the latter in a fused and superheated condition with the platinum. At a point far above their melting temperature the ferrous metals appear to lose their lack of affinity for platinum.

In the present invention I have, however, devised a simpler and easier method of effecting the desired type of union and in lieu of directly uniting the noble metal sheath with a ferrous metal core, I unite them through the intermediacy of a linking layer of another metal, such layer being in true metallic union on the one side with the core metal and on the other side with the sheath metal. This linking metal must be one of the high-melting, ductile metals susceptible of being worked at steel working temperatures since ordinarily the sheath and core are best assembled to form a comparatively large compound billet and this then worked down to final dimensions, as in making the very fine leading-in wires. Aside from the economy of producing a comparatively small-area weld between relatively large bodies of metal and then working down to finished dimensions, in such working down the platinum is much improved in quality, being made denser and hardened. A low-melting metal in the linking layer obviously cannot be used for the present purposes, and, furthermore, all such low-melting metals, such as lead, tin, antimony, etc., cannot safely be heated in contact with platinum. The metal must of course be ductile. Copper, silver and gold, and their various alloys, may be used as the linking layer. These metals are high-melting, ductile and have a comparatively high rate of expansion.

Copper, silver and gold are also difficult to unite with ferrous metals and iron-like metals to produce a weld union, but such a union can be effected by superheating them in a molten state to a temperature far above their melting points and thereafter contacting with a clean surface of the ferrous metal. Under these conditions, the supermolten non-ferrous metal readily wets the surface of the ferrous metal and unites therewith to form a union which, when the joined metals are cold, will resist discovery by a cleaving tool, such as a cold chisel, which resists violent temperature changes, as in heating and quenching, and which is inseparable by mechanical force; i. e., which is equivalent to, if not actually, a weld union. It is material of this character which I preferably use in the present invention. On the other hand, copper, silver and gold readily unite with platinum when contacted therewith in a heated condition and with clean surfaces, even where the heat is merely that sufficient to soften these metals. Heat and pressure in this respect are somewhat reciprocal.

In the present invention, therefore. I take a rod or bar of a strong ferrous metal having about the same rate of expansion as the glass with which it is to be used later. A pure, carbon-free iron may be employed, but preferably I use a nickel-steel of such composition as to give the correct rate of expansion. This bar I next coat with a film-like coating of copper, silver or gold, preferably having the coating welded-on as described. Copper is suitable. The rate of expansion of the bar and the thickness of the copper film may be so correlated as to give a total rate of expansion for the filmed bar equivalent to that of the same thickness of the glass to be used. This filmed bar I next insert in a sheath or shell of platinum fitting as closely as possible, both bar and shell being at the ordinary temperatures. The assembled bar and sheath are next heated to a high temperature, approaching or exceeding the melting point of the filming metal. The shell and core having about the same rate of expansion, the space between them does not appreciably change in this heating, but the filming metal having a much higher rate of expansion expands greatly and positively fills every portion of the space between them. The heat may be and preferably is carried far enough to render this filming metal liquid or plastic. Under the heat and pressure the fluent filming metal positively unites with the surface of the platinum shell, forming a true metallic union therewith. Preferably, as stated, I use for the core a bar of metal which has been weld-clad with copper; that is, a compound bar in which the copper is already united by a true metallic union with the core metal. In the product so formed therefore the copper is a linking means united to the platinum on the one side and the ferrous metal on the other, in both cases with a true metallic or molecular union. When the compound bar so formed is allowed to cool, the copper or copper containing layer of course again contracts, but since it is permanently and metallically united with the metal on either side, in such contraction no spaces open.

In the accompanying illustration I have shown, more or less diagrammatically, means and materials useful in an embodiment of the described process.

In this showing:—Figure 1 shows, partially in vertical section a muffle furnace containing bodies of metal to be united; and Fig. 2 is a cross section of united metals.

In the showing of Fig. 1, element 1 is a muffle furnace having any suitable means of heating and provided with muffle 2, closed by door 3. Within the muffle is shown a bar 4 of ferrous metal within a sleeve 5 of platinum or like metal. Near the ends of the sleeve are placed pellets 6 of gold, solder, or the like. Upon heating the assembled metals within the muffle to a temperature about the melting point of copper, the core expands against the shell and produces the desired type of union.

In Fig. 2, 7 is a core metal, and 9 is a sheath weld-united thereto. Black line 8 may represent either a film-like layer of copper or like metal or the interpenetration of the metals along the line of weld.

Heat and pressure being, as stated, in these operations in some degree reciprocal, a perfectly clean ferrous metal bar may be given a coating of copper, silver or gold by another method in lieu of the weld coating operation described. Many of the usual methods for forming coatings of these high melting metals upon metals of the iron class give coating layers which are more or less porous, as in the case of electroplating, but with care in manipulation the expansion in heating to the melting point or thereabout of the coating metal will generally be sufficient to fill these porosities. And while copper and copper-like metals do not readily unite with iron, as stated, yet under the circumstances here prevailing the union may be forced. It is however much better to use the weld-clad core in which a metallic union between the film and core has already been effected.

In forming the compound metal under the present invention, a number of expedients are useful. The film-clad core may first be given a true metallic surface by sandpapering or other treatment, the thickness of the coating being made film-like in this operation if not already so. There should be no oxid between the metals when the union is effected. This bright clean coated bar I may next dip in a strong solution of borax and dry. This leaves the bar coated with a thin layer of hydrated borax. Zinc chlorid or other fluxes may be employed but borax is suitable. The film-coated bar, which may have been thus treated, is next inserted in a snugly fitting platinum tube. It is preferable that both core and shell be cylindrical in section, to produce uniformity of pressure at all points, but other corresponding shapes may be employed. The assembled core and shell are next heated in any suitable furnace. Under the heat the borax, when this substance is used, first gives up its water which expels any air between the two metals and replaces it by steam. Steam has no oxidizing effect either on platinum or copper though it oxidizes steel. With the described non-porous coating, the steam cannot reach the underlying steel. After expulsion of the water the borax melts and the expansion of the copper forces it out of the space between the metals toward the two ends of the bar and shell, the expanding copper taking its place. When the copper begins to soften, under the heat and pressure it quickly unites with the platinum to form a positive union, and if it be not already so united with the ferrous metal core, it forms a similar union with such core under the prevailing pressure. This union of the linking metal to the core is more readily produced where such core is of pure iron than where it contains carbon. In assembling a tight fitting core with a platinum tube it often happens that the ends of the platinum tube are somewhat belled outward, and in such cases it is often a useful expedient to put a little lump of gold solder against the end. On heating the solder melts and capillarily enters any such space.

Preferably the temperature of this operation is carried above the melting point of the filming metal, and preferably also the filming metal is quite small in amount. Under these circumstances the filming metal may altogether disappear as a separate entity, merging with the metal on either side. Under such conditions the compound metal object will have a core of the one metal and a sheath of the other united by a linking layer or layers containing the filming metal. Upon cooling, the core and sheath will be found united with a union which will resist destruction by changes of temperature and mechanical force. The compound bar may be readily drawn down to wire of any fineness desired without parting or rupture, even to a fineness where the platinum sheath becomes a very thin film; a film utterly incapable of supporting itself alone. Wire of this character having the same rate of expansion as the glass to be used and having only platinum to come in contact with the glass, is readily sealed therethrough to form permanent unions; unions with the glass of a type similar to those given by solid platinum with suitable glass. The wire however being substantially all ferrous metal is of much greater strength than platinum wire and is therefore more desirable for the present purposes. The platinum gives a wetting union with the glass and the copper in turn gives a wetting union with both the platinum and the core. In a lamp provided with leading-in wires of this character the platinum is, so to speak, a linking means between the glass and the copper, and the copper a linking means between the platinum and the ferrous metal. There is no avenue or seam in such a wire for the penetration of gas, and lamps provided therewith will retain vacuum indefinitely. The compound wire, as a matter of fact, works rather better for leading-in wires with most glass than solid platinum for the reason that it can be adjusted in expansion to such glass so as not to have a greater expansion and for the reason that such platinum is apt at times to have seams or pores caused by imperfect welding of the scrap platinum used for making it. Many of the stronger commercial glasses have rates of expansion materially below that of platinum.

In a compound wire of the present type, however, the platinum tube in drawing down from the original billet to a fine wire is compressed and compacted between the relatively stiff core metal and the working tools while held against lateral yielding by the existence of the basal weld union with the metal underneath, and assumes throughout its thickness a texture comparable with the surface texture of hard drawn wire, receiving a smooth planished surface and having all porosities obviated in the film-like thickness of the platinum on the finished wire. As a matter of fact, there is usually no room for the existence of pores within the body of the film-like platinum coating.

While as stated, pure iron and other ferrous metals having the correct rate of expansion may be employed in the present invention, I preferably use nickel-steel as its rate of expansion is easy of regulation by regulating the proportions of the iron and the nickel therein. Core metals of copper alloys are much less suitable. While gold and silver may be used for the filming or linking metal, I prefer copper as cheaper and perfectly suitable.

While gold and silver are less suitable sheathing metals than platinum, glass not wetting them as well and they being metals of greater expansion than glass, they may still be used by dint of sundry expedients. Gold and silver are both metals of high electrical conductivity; higher than that of platinum. The core may, for instance be made of nickel steel of such a low rate of expansion that it compensates for the high rate of expansion of film and sheath, giving the compound metal body as a whole the desired rate of expansion, that of the glass with which it is to be used. Such a sheath, moreover, expanding, as it will, more than the core, in the described method of producing union would of course expand away from the core, increasing the space between them. This may, however, be obviated by using a very hot gold tube of such dimensions that it will just fit over the cold, filmed core, and then heating as before. Under these circumstances, the expansion of the filming metal will take up all the space between core and sheath and produce the desired union and the desired composite body of metal. Leading-in wires carrying a sheath of other platinum group metals than platinum, may be employed; but are not more desirable.

As stated, I preferably preliminarily make a rather thick compound metal body and afterward extend this hot, as by rolling or drawing, or both, to secure the advantages of compacting the coating and obviating porosities therein and of giving it the described texture. In this coextension which may be done hot, the union is also perfected.

The heating is preferably carried to a point where the intermediate filming metal is freely fluid, both to secure a higher rate of expansion and a better wetting contact with the sheath metal. Where the film is copper and welded to the ferrous metal base, the melting will not destroy the union while with an unwelded film, fluidity much promotes a union to the ferrous metal while it causes a positive filling up of the inevitable porosities of such coatings. Platinum will unite with merely plastic copper under the pressure between core and sheath, but of course with the fluid filming metal the union is much more positive, as is the obviation of superficial unevennesses in the interior of the sheath. In no case however should the amount of filming metal be great; it is preferable that it be merely enough to produce pressure and union. This amount will generally be taken up by the metals on either side under the heat and pressure. If the amount of filming metal be much greater, where copper or silver is used, it may disadvantageously affect the platinum.

What I claim is:—

1. The process of producing clad metals which comprises producing a coating of a metal of high expansion upon a core of metal of lower expansion, placing the coated core within a closely fitting shell of noble metal and heating to the fusing point of such coating metal to produce a metallic union between the core and shell.

2. The process of producing platinum clad ferrous metal which comprises providing a core of ferrous metal with a welded-on coating of copper by contacting such core with liquid copper heated above its melting point, cooling the coated core, placing within a tightly fitting platinum sheath and heating the assembled objects until the copper is molten.

In testimony whereof, I affix my signature in the presence of witnesses.

BYRON E. ELDRED.

Witnesses:
A. M. SENIOR,
LEWIS T. KNOX.